8 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

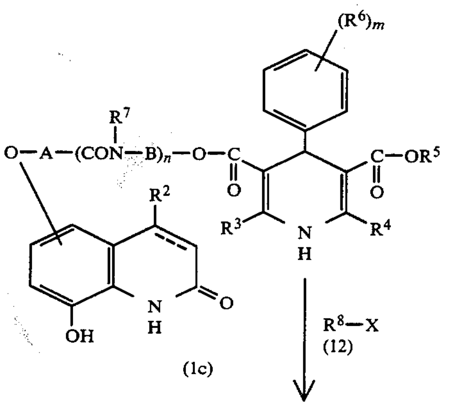

(1c)

$R^8$—X (12)

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful $$\cos\beta^* = \frac{K_2 - n\frac{T'}{v''}}{\sqrt{K_1^2 + \left(K_2 - n\frac{T'}{v''}\right)^2 + K_3^2}}$$

$$v'_{ref}(t) = K\,r\,\delta\left(t - \frac{2L - 2d_s}{v_w}\right) + K(1 - r^2)e^{-2\alpha_s d_s}$$

8 PT.

... are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful $$(K_1x+K_2y+K_3z+T)+n(K''_1x+K''_2y+K''_3z+T'')=0$$

| $r_1$ ($L_1$) | $r_6$ ($L_3$) | $r_7$ ($L_4$) |
|---|---|---|
| K = 1.0 | K = 1.0 | K = 0.0 |
| $C_2$ = 0.0 | $C_2$ = 0.0 | $C_2$ = 0.0 |
| $C_4$ = $-0.15691 \times 10^{-6}$ | $C_4$ = $+0.95381 \times 10^{-7}$ | $C_4$ = $-0.22891 \times 10^{-5}$ |
| $C_6$ = $-0.40068 \times 10^{-10}$ | $C_6$ = $-0.73871 \times 10^{-10}$ | $C_6$ = $+0.12283 \times 10^{-9}$ |
| $C_8$ = $+0.21016 \times 10^{-13}$ | $C_8$ = $+0.12280 \times 10^{-13}$ | $C_8$ = $+0.84230 \times 10^{-13}$ |
| $C_{10}$ = $-0.37685 \times 10^{-17}$ | $C_{10}$ = $-0.33177 \times 10^{-17}$ | $C_{10}$ = $-0.20592 \times 10^{-16}$ |

$f_1$ = 314.6
$f_2$ = 88.0
$f_3$ = −481.2
$f_4$ = −99.6

100mm

= 101.2 Aperture ratio: 1:1.10
lagnification of projection: $-7.997^x$
alf angle of view: 28.56°

| | | | |
|---|---|---|---|
| 143.454 | $d_1$ = 11.0 | $n_1$ = 1.49380 | $L_1$ |
| −1542.254 | $d_2$ = 68 | | |
| 16.976 | $d_3$ = 20.0 | $n_2$ = 1.62286 | $L_2$ |
| 10.914 | $d_4$ = 2.87 | | |
| −89.375 | $d_5$ = 5.0 | $n_3$ = 1.59501 | $L_3$ |
| −127.071 | $d_6$ = 58.8 | | |
| −48.609 | $d_7$ = 5 | $n_4$ = 1.49380 | $L_4$ |
| ∞ | | | |
| ∞ | $d_8$ = 5 | $n_5$ = 1.45000 | S |
| ∞ | $d_9$ = 8 | $n_6$ = 1.51872 | G |

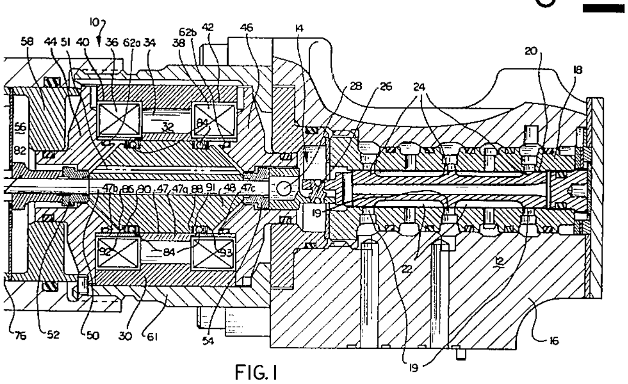

FIG. 1

IMAGE SYSTEM
TEST TARGET
A

U.S. DEPARTMENT OF COMMERCE
PATENT AND TRADEMARK OFFICE

INVENTOR
OWEN H. SCHELDORF
BY [signature]
HIS ATTORNEY

Patented March 30, 1971 3,572,978

INVENTOR.
OWEN H. SCHELDORF

BY Walter E. Kule

HIS ATTORNEY

HERMETIC COMPRESSOR HAVING LUBRICANT-COOLING MEANS

BACKGROUND OF THE INVENTION

Hermetic compressor units such as those used in the refrigeration industry usually contain a body or reservoir of lubricating oil in the lower portion of the compressor casing. This lubricant is primarily employed to lubricate the various bearing surfaces of the compressor unit and to this end means are provided for conveying lubricant from the reservoir to the such surfaces. Many hermetic compressor units also include means for circulating the lubricating oil over the drive motor for cooling this component. In order to use as much of the casing surface as possible for removing heat from the lubricant, it is also a common practice to provide means for directing a flow of lubricant onto the upper portions of the casing so that the oil is cooled as it flows downwardly along the casing sidewalls.

SUMMARY OF THE INVENTION

A primary object of the present invention is to provide a hermetic motor compressor unit in which the components are so constructed and arranged that the same portion of the lubricant-circulating means can be employed for both directing lubricant on the motor for cooling the motor and onto the casing for cooling the lubricant.

A more specific object of the invention is to provide a hermetic motor compressor unit including a lubricant pump adapted to provide a pulsating output flow and means for discharging lubricant from the pump onto the casing during maximum flow of lubricant and onto the motor when the flow of lubricant is below maximum.

In accordance with the illustrated embodiment thereof, the hermetic motor compressor unit of the present invention includes a hermetic casing containing a body of lubricating oil in the lower portion thereof and a motor compressor unit including an upper motor component and a lower compressor component connected by a vertically extending shaft. The shaft includes a longitudinally extending lubricant passage connected in the upper portion of the shaft to a transversely extending passage having an outlet in an exposed surface of the shaft above the motor component. The unit also includes a lubricant pump, which as a single vane and eccentric-type pump, which provides a pulsating flow of lubricant through the longitudinal and transverse passages. The transverse lubricant passage is so positioned relative to the motor windings that during maximum flow of lubricant from the pump, the stream of lubricant from the transverse passage passes over the top of the motor and into contact with the casing while during periods of lesser flow of lubricant from the transverse passage, the trajectory of the lubricant stream is such that the lubricant is directed onto the motor for cooling purposes.

BRIEF DESCRIPTION OF THE DRAWING

In the accompanying drawing:

FIG. 2 is a sectional view taken along line 3–3 of FIG. 2;

DESCRIPTION OF THE PREFERRED EMBODIMENT

Figures 1, 2:
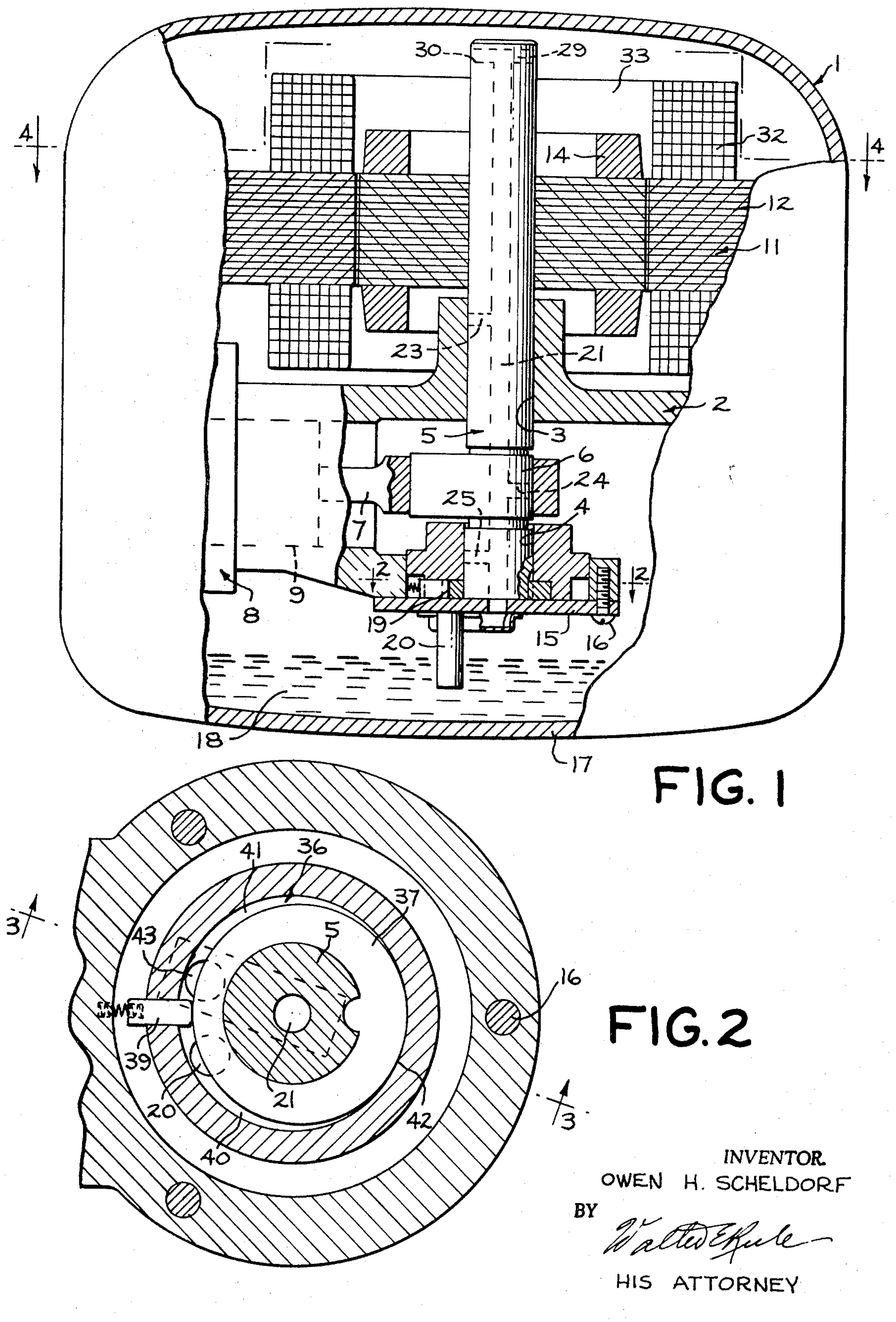
FIG. 1 is a vertical sectional view of a portion of a hermetic motor compressor unit of the present invention.
FIG. 2 is a horizontal sectional view taken generally along line 2–2 of FIG. 1.

Referring to the drawing and particularly to FIGS. 1—4 thereof, there is shown a hermetic compressor unit including a hermetic casing or housing 1 in which there is suitably supported a motor compressor unit. This unit includes a frame generally indicated by the numeral 2 comprising vertically aligned upper bearing 3 and lower bearing 4 in which is journaled a vertically extending shaft 5. The lower portion of the shaft 5 includes an eccentric 6 on which is mounted a connecting rod 7 of the compressor component 8, the rod 7 being connected to a piston 9. A thrust plate 15 secured as by means of bolts 16 to the lower surface of the frame 2 serves as a thrust bearing surface for the lower end of the shaft 5.

The motor component 11 for driving the compressor 8 is mounted generally above the frame 2 and includes a stator 12 and a rotor 14 keyed to the shaft 5. The illustrated motor 11 is a two-pole motor so that the stator 12 includes a pair of diametrically opposed start windings 32 and a pair of diametrically opposed run windings 33 between the start windings.

The lower end of the casing 1 forms a sump or reservoir 17 for containing a body of lubricating oil 18. For the purpose of providing lubricant from the sump 17 to the bearings 3 and 4, there is provided a rotary pump 19 at the lower end of a driven by shaft 5. The pump 19 is adapted to withdraw lubricant from the sump 17 through an inlet 20 and to discharge lubricant into the lower end of an axially or longitudinally extending passage 21 in the shaft 5. Radially extending passages 23, 24 and 25 respectively convey portions of the lubricant from the passage 21 to the upper bearing 3, the eccentric 6 and the lower bearing 4.

Figures 3, 4:
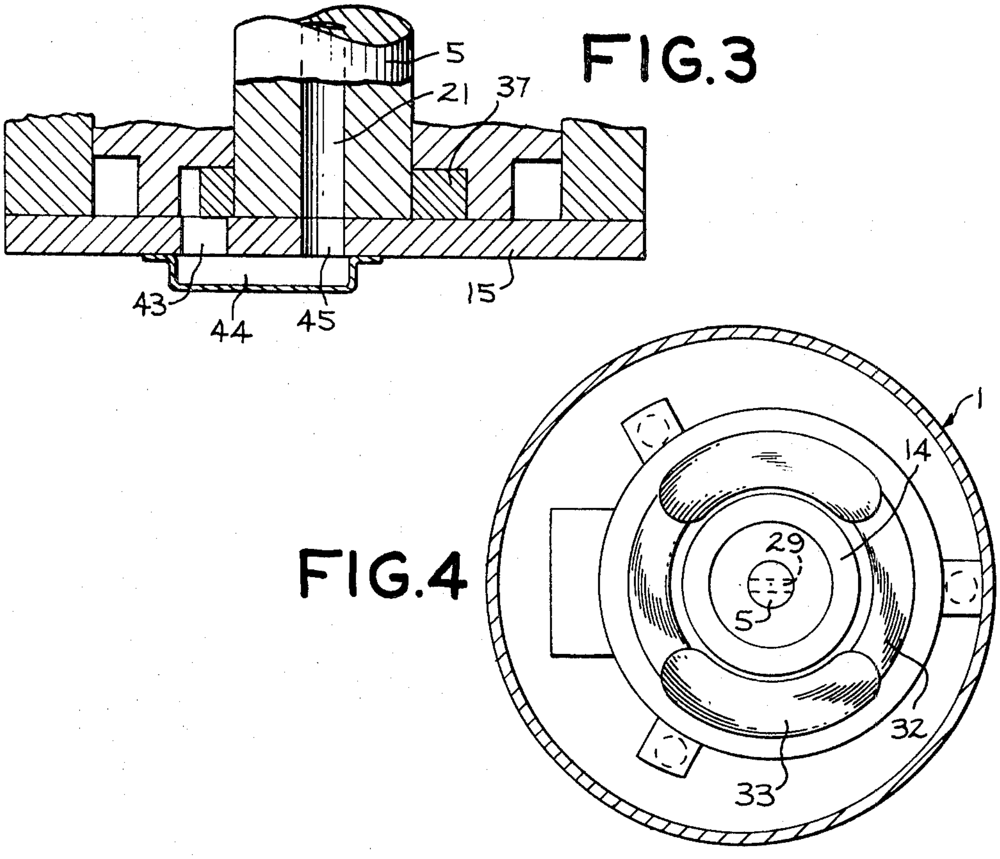
FIG. 4 is a horizontal sectional view taken generally along line 4–4 of fIG. 1.

As shown particularly in FIGS. 1 and 4 of the drawing, the longitudinal lubricant passage 21 connects in the upper portion of the shaft 5 to a transversely extending passage 29 having outlets 30 on opposite sides of the shaft periphery above the motor rotor 14.

In accordance with the present invention, the transverse passage 29 serves the dual function of directing portions of the oil from the passage 21 onto the run windings of the motor and other portions of the oil onto the sidewalls of the casing 1. To this end, there is employed a lubricant pump having a pulsating or surging output and the transverse passage 29 is so oriented with reference to the pump output and the motor windings as to accomplish the aforementioned lubricant distribution during rotation of the shaft 5.

A suitable pump for providing a pulsating flow of oil to and through the passages 21 and 29 is shown in detail in FIGS. 2 and 3 of the drawing. This pump comprises an annular chamber 36 defined by an annular bore in the lower surface of the frame 2 and the thrust plate 15. This pumping chamber contains an impeller or eccentric 37 keyed to and rotated by and with the shaft 5. A vane 39 spring biased into engagement with the peripheral surface of the eccentric divides the chamber 36 into a low pressure side 40 and a high-pressure side 41. Upon rotation of the eccentric 37, a point 42 thereon remains in continuous engagement with the annular wall of the chamber 36 so that the volumes of the high- and low-pressure pressure sides are continuously changing. Oil from the reservoir 17 is drawn into the pump through the inlet tube 20 and is discharged from the pump through the outlet port 43 which is connected to the lower end of the passage 21 through a channel-shaped member 44 and opening 45 in the thrust plate 15.

Figure 5:
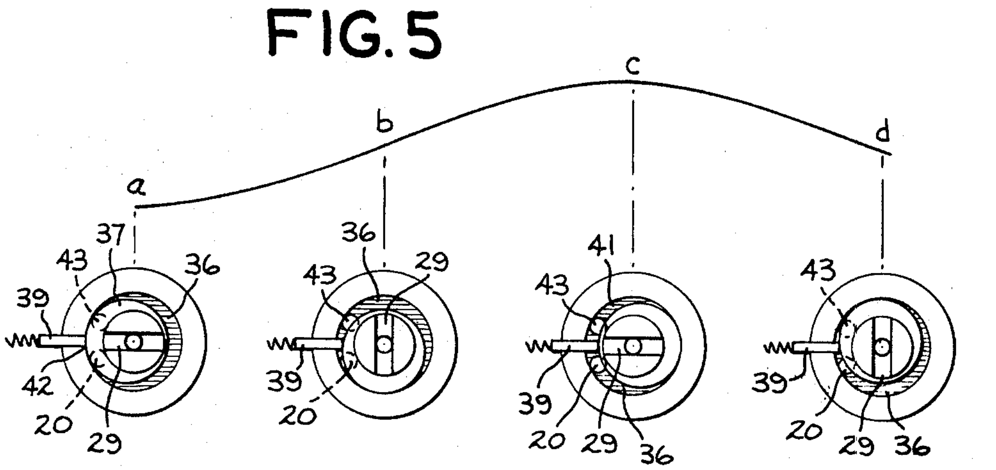
FIG. 5 diagrammatically illustrates the operation of the lubricant flow means of the present invention.

In the operation of a pump of this type, the discharge of oil through the discharge port 43 varies from zero to a maximum and back to zero during each rotation of the eccentric 37. This change in flow is best illustrated in FIG. 5 of the drawing. When the eccentric 37 is in position A with the point 42 engaging the sidewall of the pumping chamber 36 adjacent the vane 39, the discharge port 43 is closed by the eccentric 37 and there is a substantially zero output flow through the port and upwardly through the passage 21. As the eccentric 37 rotates in a counterclockwise direction through 90° to the position B, the port 43 is gradually opened and the flow of oil from the chamber 36 gradually increases until it reaches a maximum when the eccentric has rotated through an additional 90° to position C. From position C to position D, which is 90° removed from point C, the flow decreases due primarily to the lower rate of decrease of the volume of the discharge chamber 41. This decrease in flow continues until the eccentric returns to its original position A.

Thus during one-half of each revolution of the eccentric 37, the oil flow increases from zero to a maximum while during the next 180° of rotation it decreases from maximum to zero flow. At maximum pump output, the velocity of the oil pumped upwardly through the passage 21 is, of course, also maximum with the result that this high velocity flow causes the oil to issue from the outlets 30 at its maximum velocity and highest stream trajectory.

By the proper positioning or orientation of passage 29 with reference to the pump eccentric 37, the cyclic change in the velocity of the oil streams issuing from the outlets 30, which in turn changes the trajectory of the stream of oil flowing from these outlets, is employed to effect a discharge of some of the oil onto the run windings of the motor and another portion of the oil over the top of the motor stator component and into contact with the upper surface of the casing 1.

To this end, the passage 29 and the stator 12 are so oriented with regards to one another that during peak or maximum flow of lubricant from the passage 29 when the trajectory of the issuing oil streams is highest, the stream will be aimed in the direction of the start winding 32 but their trajectories will be high enough to shoot over the start windings and onto the casing sidewall. When the oil flow is less than maximum, i.e., is increasing or decreasing, passage 29 will be aimed in the direction of the run windings and the oil streams, have lower trajectories, will contact the windings.

Preferably, as illustrated in FIG. 5 of the drawing, the passage 29 is in substantially alignment with the point of engagement 42 of the eccentric 37 with the annular sidewall of the chamber 36 and the motor stator is oriented so that the start windings are in the same vertical plane as vane 39. Thus the outlets 30 point in the general direction of the start windings 32 during maximum flow of refrigerant from the passage 29 and in the direction of the run windings during the periods that the oil flow is increasing or decreasing. During maximum flow of oil from the passage 29, the trajectory of the issuing oil stream is high enough so that the oil streams clear the upper ends of the start windings 32 and hit the sidewall of the casing. As the flow of oil is either increasing or decreasing so that the trajectory of the oil stream is less than maximum, the opposed outlet ends 30 of the passage 29 are directed towards the run windings with the result that during these periods most of all of the oil is discharged onto the run windings which, of course, are the warmer parts of the motor since they carry current whenever the motor is operating.

From the above description it will be seen that the same transverse passage 29 provides flow of oil onto the motor stator components for cooling purposes and onto the casing for dissipating the heat in the oil. Specifically, both of the run windings are bathed with oil twice during each revolution of the shaft 5, that is at the times the shaft is generally in or near positions B and D of FIG. 5 while the oil issuing from the passage 29 at maximum velocity, that is when the eccentric 37 and passage 29 are in approximately positions C, passes over the top of the motor and onto the inner surface of the casing 1 once during each shaft revolution.

In order to assure the maximum possible flow of oil over the run windings 33, the passage 29 preferably extends entirely and diametrically through the shaft 5 so that each of the run windings receive an oil bath twice during each revolution of the shaft. However, if desired, the transverse passage 29 may be a radial passage extending from only one side of the passage 21 in which case each run winding will be bathed by oil once during each revolution of the shaft 5.

It will be obvious also that the transversely extending passage 29 need not be horizontal or normal to the passage 21. For example, one or both end sections thereof, that is the sections of the passage 29 on opposite sides of the passage 21, may slant upwardly or downwardly as required to obtain the trajectory pattern providing the aforementioned distribution of the oil issuing therefrom. The slope of the passage sections depends, for example, upon the relative elevations of the upper ends of the motor windings with reference to the axis of passage 29 as well as on the velocity of the oil output from the pump 19, both of which determine the trajectory pattern of the oil streams issuing from the passage 29.

While there has been shown and described a particular embodiment of this present invention, it will be understood that is is not limited thereto and it is intended by the appended claims to cover all modifications that fall within the spirit and scope of the invention.

I claim:

1. In a hermetic compressor including:
   - a casing containing a body of lubricant and motor-compressor unit including an upper motor component and a lower compressor component supported in said casing and connected by a vertically extending shaft;
   - said shaft having a longitudinally extending lubricant passage connected to a transversely extending passage in the upper portion of said shaft;
   - said unit including a single vane and eccentric rotary pump driven by said shaft for providing a pulsating flow of lubricant through said longitudinal and transversely extending passages which varies between substantially zero and maximum flow during each revolution of said shaft; and
   - said transversely extending passage being positioned to discharge lubricant over the top end of said motor and into contact with said casing during maximum flow of lubricant through said transverse passage and onto said motor during periods when the flow of lubricant through said transversely extending passage is below maximum.

2. The compressor of claim 1 in which said motor component is a two-pole motor including a pair of opposed run windings and said transversely extending passage is arranged to discharge lubricant onto said run windings during periods when said flow is below maximum.

3. In a hermetic compressor including:
   - a casing containing a body of lubricant in the lower portion thereof and a motor-compressor unit including an upper motor component and a lower compressor component supported in said casing and connected by a vertically extending shaft;
   - said shaft having a longitudinally extending lubricant passage terminating in the upper portion of said shaft in a transverse passage extending through said shaft above the motor rotor with outlet openings on opposite sides of said shaft;
   - said motor being a two-pole motor including a stator having two spaced diametrically opposed run windings and two spaced diametrically opposed start windings;
   - said unit including a rotary pump driven by said shaft for providing a pulsating flow of lubricant upwardly through said longitudinal passage; and
   - said transverse passage being positioned to discharge streams of lubricant over the tops of said start windings and into contact with said casing during maximum flow of lubricant through said transverse passage and onto said run windings when the flow of lubricant through said passage is below maximum.